US006286420B1

(12) United States Patent
Yonezawa

(10) Patent No.: US 6,286,420 B1

(45) Date of Patent: Sep. 11, 2001

(54) OVERLOAD PROTECTOR FOR MECHANICAL PRESS

(75) Inventor: Keitaro Yonezawa, Kobe (JP)

(73) Assignee: Kabushiki Kaisha Kosmek, Hyogo (JP)

(*) Notice: Subject to any disclaimer, the term of this patent is extended or adjusted under 35 U.S.C. 154(b) by 0 days.

(21) Appl. No.: 09/466,821

(22) Filed: Dec. 20, 1999

(30) Foreign Application Priority Data

Dec. 18, 1998 (JP) ........................................ 10-360238

(51) Int. Cl.[7] ........................................ F16P 3/00

(52) U.S. Cl. ........................................ 100/346

(58) Field of Search ........................................ 100/346, 342, 100/347; 72/19.9, 21.4, 21.5, 28.1, 100

(56) References Cited

U.S. PATENT DOCUMENTS 4,085,669 * 4/1978 Yonezawa ........................ 100/346
4,166,415 * 9/1979 Spanke et al. ........................ 100/346
4,593,547 * 6/1986 Heiberger ........................ 72/1
4,760,781 * 8/1988 Moriyama ........................ 100/346
4,827,839 * 5/1989 Yonezawa et al. ........................ 100/346
5,216,959 * 6/1993 Hayashie ........................ 100/346
5,620,024 4/1997 Yonezawa .
5,638,748 * 6/1997 Daniel ........................ 100/346

FOREIGN PATENT DOCUMENTS 5-20629 3/1993 (JP) .

* cited by examiner

*Primary Examiner*—Peter Vo
*Assistant Examiner*—Louis K. Huynh
(74) *Attorney, Agent, or Firm*—Bacon & Thomas, PLLC

(57) ABSTRACT

A pneumatic hydraulic booster pump (5), an overload protecting valve (10) and a pressure compensating valve (14) are connected in parallel with an overload absorbing hydraulic chamber (3) within a slide (2) of a mechanical press (1). The pressure compensating valve (14) has a restricting passage (60) and a relief valve (61) connected to each other in series. The relief valve (61) comprises a valve closing piston (71) which pushes a relief member (72) in a direction for valve closing, a valve closing actuation chamber (73) which communicates with a compressed air supply passage (30) of the booster pump (5), and a compression spring (74) which urges the relief member (72) in the direction for valve closing.

7 Claims, 2 Drawing Sheets

OVERLOAD PROTECTOR FOR MECHANICAL PRESS

BACKGROUND OF THE INVENTION

1. Technical Field

The present invention relates to an overload protector for a mechanical press.

2. Description of the Prior Art

There is a conventional device which is recited in Japanese Patent Publication No. 5-20629 the present inventor proposed earlier, as an example of the overload protector of this type.

The conventional device comprises an overload absorbing hydraulic chamber formed within a slide of a mechanical press and an overload protecting valve connected to this overload absorbing hydraulic chamber. The overload protecting valve has an interior area provided with a relief member and a valve closing spring of a pressure compensating valve. The relief member is adapted to act for valve closing through an urging force of the valve closing spring.

The above-mentioned pressure compensating valve serves to relieve pressurized oil within the hydraulic chamber by an amount corresponding to pressure increase when the pressurized oil has increased its pressure at a very slow speed from a set charging pressure during the press working. Therefore, it is necessary to set a relief pressure (hereafter referred to as 'set compensating pressure') of the pressure compensating valve at a value a little higher than the set charging pressure.

Consequently, in the case of enhancing the set charging pressure depending on the capacity and usage of the mechanical press, the set compensating pressure had to be increased accordingly. Similarly, in the case of decreasing the set charging pressure, the set compensating pressure had to be reduced.

The conventional technique is excellent in that it houses the pressure compensating valve within the overload protecting valve and therefore can be made compact. However, when changing the set compensating pressure, it was required to vary the urging force of the valve closing spring arranged within the overload protecting valve. This entailed a disadvantage that it took quite a labor to vary the urging force of the valve closing spring and effect a confirmation test after having varied it.

SUMMARY OF THE INVENTION

The present invention aims at making it possible to easily vary the set compensating pressure of the pressure compensating valve in correspondence with the change of the set charging pressure to the overload absorbing hydraulic chamber.

In order to accomplish the foregoing aim, an invention as set forth in claim 1 has constructed an overload protector for a mechanical press in the following manner, for example, as shown in FIGS. 1 and 2.

The overload protector is provided with a pneumatic hydraulic booster pump 5 which supplies pressurized oil under a set charging pressure to an overload absorbing hydraulic chamber 3 within a slide 2 of a mechanical press 1. And it is provided with an overload protecting valve 10 which performs a relief operation when a pressure of the hydraulic chamber 3 has exceeded a set overload pressure. It is also provided with a pressure compensating valve 14 which performs a relief operation when the pressure of the hydraulic chamber 3 increases at a very slow speed and as a result has exceeded a set compensating pressure. The pressure compensating valve 14 comprises a restricting passage 60 and a relief valve 61 connected to each other in series. The relief valve 61 comprises a valve closing piston 71 hermetically inserted into a cylinder hole 70 so as to push a relief member 72 in a direction for valve closing, a valve closing actuation chamber 73 which opposes to the valve closing piston 71 and communicates with a compressed air supply passage 30 of the booster pump 5, and a resilient means 74 for retaining residual pressure which urges the relief member 72 in the direction for valve closing.

The invention of claim 1 produces the following function and effect.

The booster pump discharges pressurized oil having its pressure increased in accordance with a sectional area ratio between a pneumatic piston and a hydraulic piston (or a hydraulic plunger). Thus when enhancing the set charging pressure to the overload absorbing hydraulic chamber, it is sufficient to increase air pressure to be supplied to the booster pump. Then this simultaneously increases air pressure to be supplied from the compressed air supply passage of the booster pump to the valve closing actuation chamber of the pressure compensating valve to result in enlarging a pushing force for valve closing of the relief valve and therefore enhancing the set compensating pressure of the pressure compensating valve.

Similarly, when decreasing the set charging pressure to the hydraulic chamber, it is enough to reduce the air pressure to be supplied to the booster pump. Then this simultaneously reduces the air pressure to be supplied to the valve closing actuation chamber to result in decreasing the pushing force for valve closing of the relief valve and therefore reducing the set compensating pressure of the pressure compensating valve.

Consequently, it is possible to automatically vary the set compensating pressure of the pressure compensating valve in correspondence with the change of the set charging pressure to the overload absorbing hydraulic chamber with ease and assuredness.

Further, even if the compressed air supply passage has lost its pressure because the press stops working or for the like reason, the relief member can be closed through an urging force of the resilient means, which leads to a possibility of leaving pressurized oil of a predetermined pressure in the overload absorbing hydraulic chamber. Thus it is possible to smoothly and promptly recharge the pressurized oil to the hydraulic chamber.

It is preferable to attach at least one of the booster pump 5 and the overload protecting valve 10 as well as the pressure compensating valve 14 to a common block 16 as an invention of claim 2 indicates.

According to the invention of claim 2, it is possible to omit piping between at least one of the booster pump and the overload protecting valve, and the pressure compensating valve, which invites a possibility of making the device compact and besides lessening the labor for assembling the device.

Further, as indicated by an invention of claim 3, the valve closing piston 71 is integrally formed with the relief member 72. The resilient means 74 is composed of a compression spring. The resilient means 74 of the compression spring has one end connected to an end wall of the valve closing actuation chamber 73 and has the other end connected to the valve closing piston 71. In this case, the pressure compensating valve can be downsized to make the device compact.

Moreover, as indicated by an invention of claim 4, in the event the overload protecting valve 10 has a pushing force for valve closing which is an urging force of a valve closing spring 50, even if the air pressure to be supplied to the booster pump is changed, it is possible to retain the pushing force for valve closing of the overload protecting valve at an initial value and therefore prevent the set overload pressure of the overload protecting valve from varying by mistake.

BRIEF DESCRIPTION OF THE DRAWINGS

FIG. 1 is a whole system diagram of an overload protector; and

FIG. 2 is an enlarged and detailed view of a portion indicated by an arrow II in FIG. 1.

DESCRIPTION OF THE PREFERRED EMBODIMENTS

Figure 1:
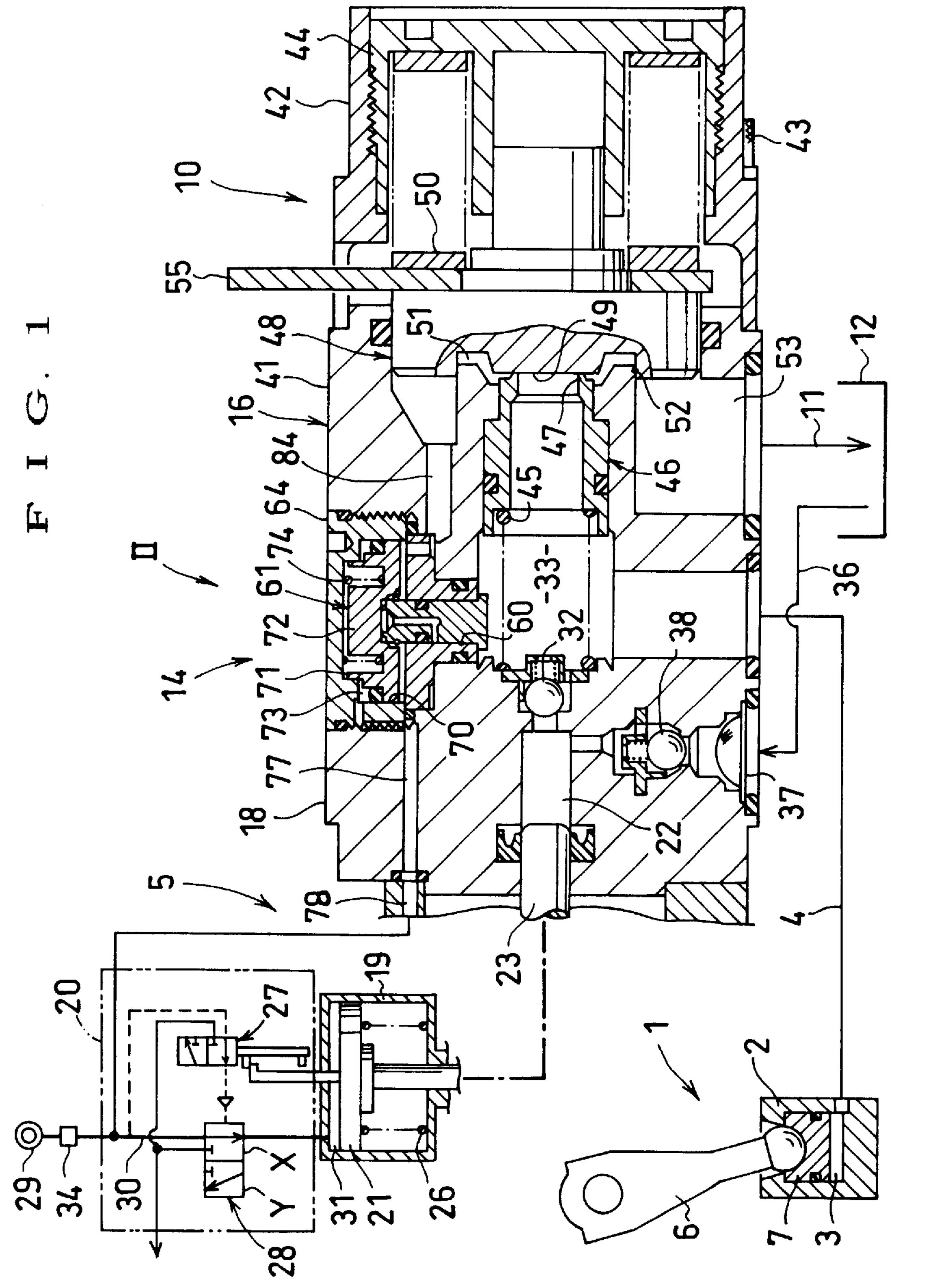
FIGS. 1 and 2 show an embodiment of the present invention.

Hereafter, an embodiment of the present invention is explained with reference to FIGS. 1 and 2. First, outline of an overload protector is explained by relying on a whole system diagram of FIG. 1.

An overload absorbing hydraulic chamber 3 is formed within a slide 2 of a mechanical press 1 of crank type. The hydraulic chamber 3 is connected to a pneumatic hydraulic booster pump 5 via a connection passage 4. The booster pump 5 supplies pressurized oil of a set charging pressure to the hydraulic chamber 3. And the mechanical press 1 has a connecting rod 6 from which a pressing force is transmitted to a piston 7. The pressing force is adjusted to be added to a work material (not shown) through the pressurized oil within the hydraulic chamber 3.

When a pressure of the hydraulic chamber 3 has exceeded a set overload pressure with overload imposed on the slide 2 for any reason, an overload protecting valve 10 performs a relief operation to discharge the pressurized oil within the hydraulic chamber 3 into an oil reservoir 12 through the connection passage 4, the overload protecting valve 10 and a discharge passage 11 in order. Thus a lowering force which is acting on the piston 7 is absorbed by a compressing operation of the hydraulic chamber 3 so as not to be transmitted to the slide 2, which results in protecting the overload.

The pressurized oil within the hydraulic chamber 3 undergoes the pressing force during the press working to have its temperature increased. Therefore, its pressure is increasing at a very slow speed owing to volume expansion. And when the pressure increasing at the very slow speed has exceeded a set compensating pressure, a pressure compensating valve 14 performs a relief operation to discharge the pressurized oil of an amount corresponding to this very slow pressure increase into the oil reservoir 12 through the discharge passage 11. This can inhibit the overload protecting valve 10 from performing an overload operation by mistake and keep the pressure of the hydraulic chamber 3 within a predetermined range.

The set charging pressure of the booster pump 5, the set compensating pressure of the pressure compensating valve 14 and the set overload pressure of the overload protecting valve 10 have values which differ depending on the capacity and usage of the mechanical press 1. For instance, the respective values are set to about 100 $kgf/cm^2$ (about 10 MPa), about 120 $kgf/cm^2$ (about 12 MPa) and about 230 $kgf/cm^2$ (about 23 MPa).

Next, a concrete structure of the overload protector is explained.

The booster pump 5, the overload protecting valve 10 and the pressure compensating valve 14 are attached to a common block 16.

The booster pump 5 has a housing which comprises a pump case 18 formed from a left half portion of the common block 16, a pneumatic cylinder 19 fixed to the pump case 18 with a plurality of fastening bolts (not shown), and a valve case 20 fixed to the pneumatic cylinder 19. The booster pump 5 discharges pressurized oil having its pressure increased in correspondence with a sectional area ratio between a pneumatic piston 21 inserted into the pneumatic cylinder 19 and a plunger 23 inserted into a pump room 22 of the pump case 18, and it operates as follows.

Figure 2:
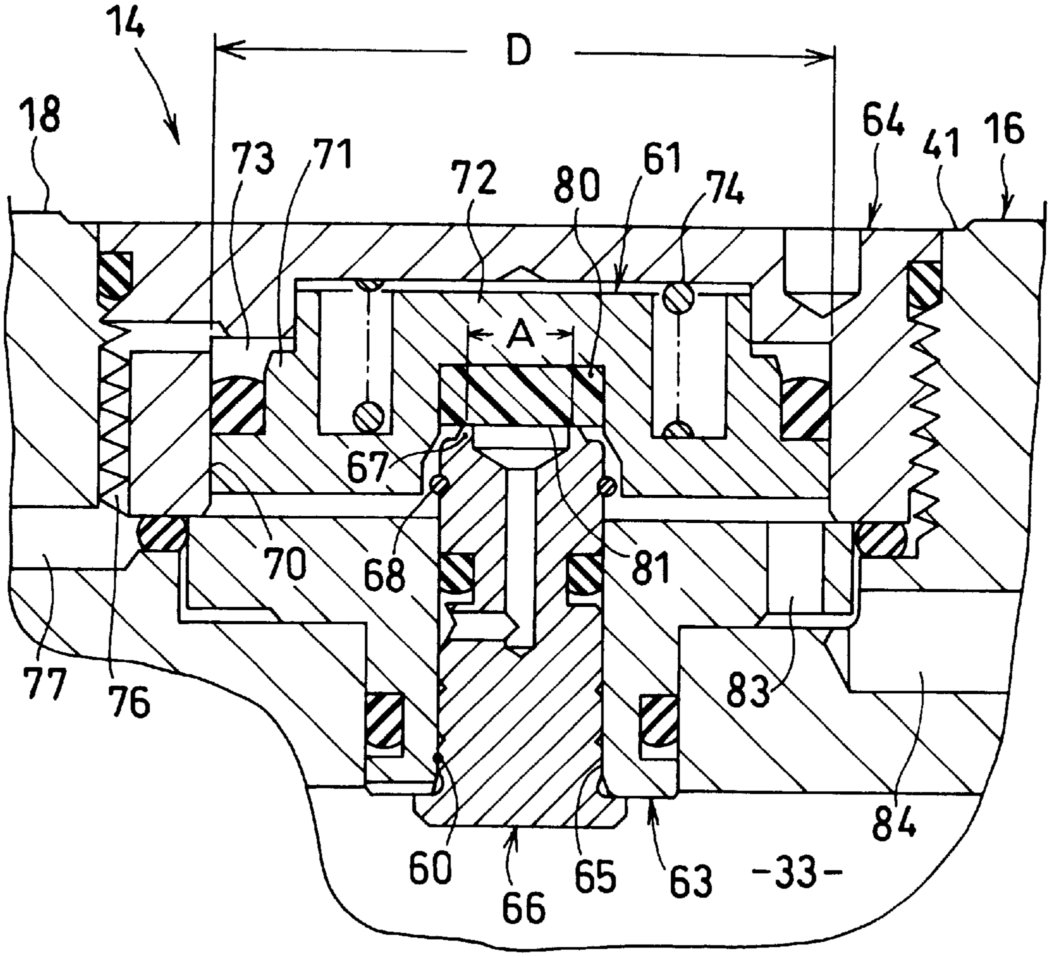

As shown in FIG. 1, when the pneumatic piston 21 returns to the vicinity of a top dead center by a return spring 26, a pilot valve 27 connected to the pneumatic piston 21 switches over a supply and discharge valve 28 from a discharge position (Y) to a supply position (X), thereby supplying compressed air of a pneumatic source 29 to a driving chamber 31 through a compressed air supply passage 30. This moves the pneumatic piston 21 to a bottom dead center and the plunger 23 fixed to the pneumatic piston 21 advances into the pump room 22 to discharge the pressurized oil into a branched room 33 through a discharge valve 32. A discharging pressure of the pressurized oil is adjusted through regulating the air pressure to be supplied to the driving chamber 31, by a pressure reducing valve 34 provided in the compressed air supply passage 30.

When the pneumatic piston 21 has reached near the bottom dead center, the pilot valve 27 switches over the supply and discharge valve 28 from the supply position (X) to the discharge position (Y), thereby discharging the compressed air within the driving chamber 31 to an exterior area. The pneumatic piston 21 moves to the top dead center by the return spring 26. Thus the plunger 23 retreats and oil within the oil reservoir 12 is sucked into the pump room 22 through a suction passage 36, a filter 37 and a suction valve 38 in order.

And the pressurized oil is charged to the overload absorbing hydraulic chamber 3 by the plunger 23 to be reciprocally driven as mentioned above, through the discharge valve 32, the branched room 33 and the connection passage 4 in order.

The overload protecting valve 10 has a housing which comprises a first case 41 composed of a right half portion of the common block 16, a second case 42 fixed to the first case 41 with a plurality of fastening bolts 43 (only one of which is shown here), and a cap bolt 44 engaged with the second case 42 in screw-thread fitting.

The overload protecting valve 10 operates as follows.

As shown in FIG. 1, if the pressure of the overload absorbing hydraulic chamber 3 is the set charging pressure, an urging force of a valve closing spring 50 pushes a valve face 49 of a relief member 48 to a valve seat 47 of a valve seat cylinder 46 pushed rightwards by an advancing spring 45. The valve face 49 has an outer peripheral space provided with a pressurizing chamber 51 for valve opening which communicates with a discharge chamber 53 via a fitting gap 52.

In the case where overload is imposed on the slide 2 to increase the pressure of the hydraulic chamber 3 higher than the set overload pressure, first oil pressure within a hole of the valve seat 47 separates the valve face 49 from the valve seat 47. Then it acts on the pressurizing chamber 51 for valve opening of a large area and the thus resulting large oil pressure rapidly moves the relief member 48 rightwards for opening. Thus the pressurized oil within the hydraulic chamber 3 is promptly discharged into the oil reservoir 12 through the branched chamber 33, the discharge chamber 53 and the discharge passage 11.

The valve closing spring 50 has a right end received by the cap bolt 44 and has a left end received by the relief member 48 through an arm 55. The arm 55 is arranged to operate a limit switch or the like sensor (not shown), thereby making it possible to detect how the overload protecting valve 10 works.

The pressure compensating valve 14 has a restricting passage 60 and a relief valve 61 connected to each other in series. Mainly as shown in FIG. 2, it is constructed in the following manner. FIG. 2 is an enlarged and detailed view of a portion indicated by an arrow II in FIG. 1.

The common block 16 is formed with a cavity having a sleeve 63 and a cap bolt 64 hermetically attached thereto in order from an inner side. The sleeve 63 has a cylindrical hole 65 into which a restrictor 66 is vertically movably and hermetically inserted. The restricting passage 60 is composed of a fitting gap defined between an outer peripheral surface of a lower half portion of the restrictor 66 and the cylindrical hole 65. The restrictor 66 has an upper portion provided with a valve seat 67 for the relief valve 61. A snap ring 68 prevents the removal of the restrictor 66.

The relief valve 61 comprises a cylinder hole 70 formed within the cap bolt 64, a valve closing piston 71 hermetically inserted into the cylinder hole 70, a relief member 72 formed at a mid portion of the valve closing piston 71 and integrally therewith, a valve closing actuation chamber 73 formed on an upper side of the valve closing piston 71, and a compression spring (resilient means) 74 for retaining residual pressure which urges the relief member 72 in a direction for valve closing. The valve closing actuation chamber 73 communicates with the compressed air supply passage 30 within the booster pump 5 through a passage 76 provided in a threaded portion of the cap bolt 64, a passage 77 provided in the pump case 18 and a passage 78 provided in the pneumatic cylinder 19 (see FIG. 1) in order.

Speaking it in more detail, the compression spring 74 has one end (a first end) connected to the cap bolt 64 which is an end wall of the valve closing actuation chamber 73 and has the other end (a second end) connected to the valve closing piston 71.

The relief member 72 has a sealing member 80 provided with a valve face 81, which is brought into contact with the valve seat 67. The valve face 81 has a sectional area corresponding to a sealing diameter (A) of the valve seat 67, onto which area oil pressure of the branched chamber 33 acts upwards. On the other hand, the piston 71 undergoes a downward action of a force resultant from air pressure acting on a sectional area corresponding to a sealing diameter (D) of the cylinder hole 70 and an urging force of the compression spring 74.

The pressure compensating valve 14 operates as follows.

When the pressure of the overload absorbing hydraulic chamber 3 is not higher than a set compensating pressure, the oil pressure acting on the valve face 81 is overcome by a valve closing force, which is the force resultant from the air pressure acting on the valve closing piston 71 and the urging force of the compression spring 74 to bring the valve face 81 into closing contact with the valve seat 67.

On the other hand, when the pressure of the hydraulic chamber 3 is increasing at the very slow speed and has exceeded the set compensating pressure, the oil pressure acting on the valve face 81 becomes larger than the valve closing force to slightly separate the valve face 81 from the valve seat 67. Thus the pressurized oil within the hydraulic chamber 3 is discharged into the oil reservoir 12 through the connection passage 4, the branched chamber 33, the restricting passage 60, a valve opening gap of the relief valve 61, a through hole 83 of the sleeve 63, a communication hole 84 of the first case 41, the fitting gap 52 of the relief member 48, the discharge chamber 53 and the discharge passage 11 in order.

Owing to this arrangement, the hydraulic chamber 3 can keep its pressure between the set charging pressure and the set compensating pressure.

In the case of enhancing the pressure for charging the pressurized oil to the hydraulic chamber 3, it is sufficient if the pressure reducing valve 34 provided downstream of the pneumatic source 29 is adjusted so as to increase the air pressure to be supplied to the driving chamber 31 of the booster pump 5. Then this simultaneously increases the air pressure to be supplied to the valve closing actuation chamber 73 to result in enlarging the pushing for valve closing of the relief valve 61 and therefore enhancing the set compensating pressure of the pressure compensating valve 14.

Similarly, in the case of decreasing the pressure for charging the pressurized oil to the hydraulic chamber 3, the air pressure to be supplied to the driving chamber 31 is reduced, which results in lowering the air pressure to be supplied to the valve closing actuation chamber 73 as well as the set compensating pressure of the pressure compensating valve 14.

In consequence, the pressure compensating valve 14 can automatically vary its set compensating pressure in correspondence with the change of the set charging pressure to the overload absorbing hydraulic chamber 3.

Further, if the compressed air supply passage 30 has lost its pressure because the press stops working or for the like reason, the valve closing actuation chamber 73 of the pressure compensating valve 14 also loses its pressure. However, the relief member 72 is brought into closing contact with the valve seat 67 through the urging force of the compression spring 74, so that pressurized oil of a predetermined pressure remains in the branched chamber 33 and the hydraulic chamber 3. This makes it possible to smoothly and promptly recharge the pressurized oil to the hydraulic chamber 3.

On supplying compressed air to the compressed air supply passage 30 at the time of the above-mentioned recharging, the compressed air acts on the valve closing actuation chamber 73 to lower the valve closing piston 71 and the relief member 72 lowers the restrictor 66. This carries foreign matters which have clogged the restricting passage 60, into the branched chamber 33.

Additionally, when the overload protecting valve 10 has performed the overload operation, as mentioned above, the relief member 48 of the overload protecting valve 10 rapidly moves for opening to thereby quickly reduce the pressure of the branched chamber 33. Therefore, the valve closing piston 71 strongly lowers the restrictor 66 through the relief member 72 to smoothly carry the foreign matters which have clogged the restricting passage 60, into the branched chamber 33.

Thus it is possible to automatically prevent the clogging of the restricting passage 60.

The foregoing embodiment can be modified as follows.

It is probable to attach to the common block 16 two instruments of the overload protecting valve 10 and the pressure compensating valve 14 instead of the three instruments of the booster pump 5, the overload protecting valve 10 and the pressure compensating valve 14. Alternatively, the common block 16 may have two instruments of the booster pump 5 and the pressure compensating valve 14 attached thereto. Further, the instruments 5, 10 and 14 may be manufactured as independent parts and be connected to each other through piping.

The relief member 72 of the pressure compensating valve 14 may be formed separately from the valve closing piston 71 instead of being formed integrally therewith. In this case, the compression spring 74, the resilient means, may be attached between the separately formed relief member 72 and the valve closing piston 71.

The resilient means may be an extension spring instead of the exemplified compression spring 74 or it may employ rubber or the like.

The restricting passage 60 of the pressure compensating valve 14 may be composed of a needle valve or the like instead of the exemplified fitting gap.

The valve closing actuation chamber 73 may communicate with the compressed air supply passage 30 outside the booster pump 5 instead of within the booster pump 5.

The pushing force for valve closing of the overload protecting valve 10 may utilize pressure of compressed air instead of the exemplified urging force of the valve closing spring 50.

What is claimed is:

1. An overload protector for a mechanical press comprising:

a pneumatic hydraulic booster pump (5) which has a compressed air supply passage (30) and supplies pressurized oil under a set charging pressure to an overload absorbing hydraulic chamber (3) within a slide (2) of the mechanical press (1);

an overload protecting valve (10) which performs a relief operation when a pressure of the hydraulic chamber (3) has exceeded a set overload pressure;

a pressure compensating valve (14) which has a restricting passage (60) and a relief valve (61) connected to each other and performs a relief operation when the pressure of the hydraulic chamber (3) increases at a very slow speed and as a result has exceeded a set compensating pressure; and the relief valve (61) comprising a cylinder hole (70), a relief member (72), a valve closing piston (71) hermetically inserted into the cylinder hole (70) so as to push the relief member (72) in a direction for valve closing, a valve closing actuation chamber (73) which opposes to the valve closing piston (71) and communicates with the compressed air supply passage (30), and a resilient means (74) for retaining residual pressure which urges the relief member (72) in the direction for valve closing.

2. The overload protector for a mechanical press as set forth in claim 1, wherein at least one of the booster pump (5) and the overload protecting valve (10) as well as the pressure compensating valve (14) is mounted on a common block (16).

3. The overload protector for a mechanical press as set forth in claim 2, wherein the valve closing piston (71) is formed integrally with the relief member (72) and the resilient means (74) is composed of a compression spring, the resilient means (74) of the compression spring having a first end connected to an end wall of the valve closing actuation chamber (73) and having a second end connected to the valve closing piston (71).

4. The overload protector for a mechanical press as set forth in claim 2, wherein the overload protecting valve (10) has a pushing force for valve closing which is an urging force of a valve closing spring (50).

5. The overload protector for a mechanical press as set forth in claim 1, wherein the valve closing piston (71) is formed integrally with the relief member (72) and the resilient means (74) is composed of a compression spring, the resilient means (74) of the compression spring having a first end connected to an end wall of the valve closing actuation chamber (73) and having a second end connected to the valve closing piston (71).

6. The overload protector for a mechanical press as set forth in claim 5, wherein the overload protecting valve (10) has a pushing force for valve closing which is an urging force of a valve closing spring (50).

7. The overload protector for a mechanical press as set forth in claim 1, wherein the overload protecting valve (10) has a pushing force for valve closing which is an urging force of a valve closing spring (50).

* * * * *